United States Patent
Mesropian

(10) Patent No.: US 10,614,211 B2
(45) Date of Patent: Apr. 7, 2020

(54) BRINGING A NON-ISOLATED APPLICATION INTO AN ISOLATION LAYER WITH AN ISOLATED APPLICATION

(71) Applicant: CA, Inc., San Jose, CA (US)

(72) Inventor: Haik A. Mesropian, San Jose, CA (US)

(73) Assignee: CA, Inc., San Jose, CA (US)

( * ) Notice: Subject to any disclaimer, the term of this patent is extended or adjusted under 35 U.S.C. 154(b) by 228 days.

(21) Appl. No.: 15/466,399

(22) Filed: Mar. 22, 2017

(65) Prior Publication Data

US 2018/0276370 A1 Sep. 27, 2018

(51) Int. Cl.
*G06F 21/53* (2013.01)
*G06F 21/56* (2013.01)

(52) U.S. Cl.
CPC ............ *G06F 21/53* (2013.01); *G06F 21/566* (2013.01); *G06F 2221/034* (2013.01); *G06F 2221/2149* (2013.01)

(58) Field of Classification Search
CPC .. G06F 21/53; G06F 21/566; G06F 2221/034; G06F 2221/2149
USPC .......................................................... 726/23
See application file for complete search history.

(56) References Cited

U.S. PATENT DOCUMENTS

| 8,510,838 B1 | 8/2013 | Sun et al. |
| 2005/0149726 A1 | 7/2005 | Joshi et al. |
| 2014/0380513 A1 | 12/2014 | Dotan |
| 2016/0006756 A1* | 1/2016 | Ismael ................ H04L 63/1441 726/22 |
| 2016/0364341 A1* | 12/2016 | Banginwar ........... G06F 12/145 |

OTHER PUBLICATIONS

International Search Report and Written Opinion issued in PCT Application No. PCT/US18/22908 dated Jun. 6, 2018; 13 pages.

* cited by examiner

*Primary Examiner* — Harunur Rashid
*Assistant Examiner* — Sakinah White Taylor
(74) *Attorney, Agent, or Firm* — Maschoff Brennan

(57) ABSTRACT

Bringing a non-isolated computer application into an isolation layer with an isolated computer application. In one embodiment, a method may include isolating a first computer application by executing the first computer application as a virtualized first computer application in an isolation layer. The method may also include receiving a request, from the virtualized first computer application, to share a computer object with a second computer application that is not executing in the isolation layer. The method may further include, in response to the receiving of the request, several acts. These acts may include executing, in real-time, at least a portion of the second computer application as a virtualized second computer application in the isolation layer. These acts may also include creating a virtualized computer object based on the computer object in the isolation layer. These acts may further include sharing the virtualized computer object in the isolation layer.

15 Claims, 4 Drawing Sheets

BRINGING A NON-ISOLATED APPLICATION INTO AN ISOLATION LAYER WITH AN ISOLATED APPLICATION

BACKGROUND

An isolation layer, sometimes also referred to as a sandbox, is a computing environment in which a software application can be executed in isolation. For example, if an application is suspected of being a potentially malicious application, such as a virus, the application may first be executed, or quarantined, in an isolation layer for a quarantine time period. While executing in the isolation layer, the application can be monitored to determine if the application exhibits any malicious behaviors. If so, the suspected application can be confirmed to be a malicious application and can be discarded. If not, the application can be approved for execution in a standard operating environment.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for bringing a non-isolated computer application into an isolation layer with an isolated computer application may be performed, at least in part, by a computing device including at least one processor. The method may include isolating a first computer application by executing the first computer application as a virtualized first computer application in an isolation layer. The method may also include receiving a request, from the virtualized first computer application, to share a computer object with a second computer application that is not executing in the isolation layer. The method may further include, in response to the receiving of the request, several acts. These acts may include executing, in real-time, at least a portion of the second computer application as a virtualized second computer application in the isolation layer. These acts may also include creating a virtualized computer object based on the computer object in the isolation layer. These acts may further include sharing the virtualized computer object between the virtualized first computer application and the virtualized second computer application in the isolation layer.

In some embodiments, the method may further include, prior to isolating the first computer application, identifying the first computer application as a potentially malicious computer application. In some embodiments, the method may further include, in response to the receiving of the request, allowing the virtualized first computer application and/or the virtualized second computer application to modify the virtualized computer object in the isolation layer without modifying the computer object outside of the isolation layer. In some embodiments, the isolation layer may prevent any computer application executing therein from modifying an operating system associated with the isolation layer and/or from communicating with any computer application executing outside of the isolation layer.

In another embodiment, a computer-implemented method for bringing a non-isolated computer application into an isolation layer with an isolated computer application may be performed, at least in part, by a computing device including at least one processor. The method may include identifying a first computer application as a potentially malicious computer application. The method may further include isolating the first computer application by executing the first computer application as a virtualized first computer application in an isolation layer. The method may also include receiving a request, from the virtualized first computer application, to share a computer object with a second computer application that is not executing in the isolation layer. The method may further include, in response to the receiving of the request, several acts. These acts may include verifying, in real-time, that the second computer application is not defined in a security policy as a private. These acts may further include executing, in real-time, at least a portion of the second computer application as a virtualized second computer application in the isolation layer. These acts may also include creating a virtualized computer object based on the computer object in the isolation layer. These acts may further include sharing the virtualized computer object between the virtualized first computer application and the virtualized second computer application in the isolation layer. These acts may also include allowing the virtualized first computer application and/or the virtualized second computer application to modify the virtualized computer object in the isolation layer without modifying the computer object outside of the isolation layer.

In some embodiments, the security policy may define, as private, computer applications and computer objects that are never to be accessed by any potentially malicious computer application.

Further, in some embodiments, the computer object may be a file stored in a file system, a file system, a network connection, a portion of memory, or a remote procedure call. In these embodiments, the corresponding request received from the virtualized first computer application may include a request to allow the virtual first computer application and the second computer application to access and modify the file in the file system, a request to allow the virtual first computer application and the second computer application to access and modify one or more files in the file system, a request to allow the virtual first computer application and the second computer application to communicate over the network connection, a request to allow the virtual first computer application and the second computer application to access and modify the portion of memory, or a request to allow the virtual first computer application and the second computer application to execute the remote procedure call, respectively.

Also, in some embodiments, one or more non-transitory computer-readable media may include one or more computer-readable instructions that, when executed by one or more processors, cause the one or more processors to perform a method for bringing a non-isolated computer application into an isolation layer with an isolated computer application.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
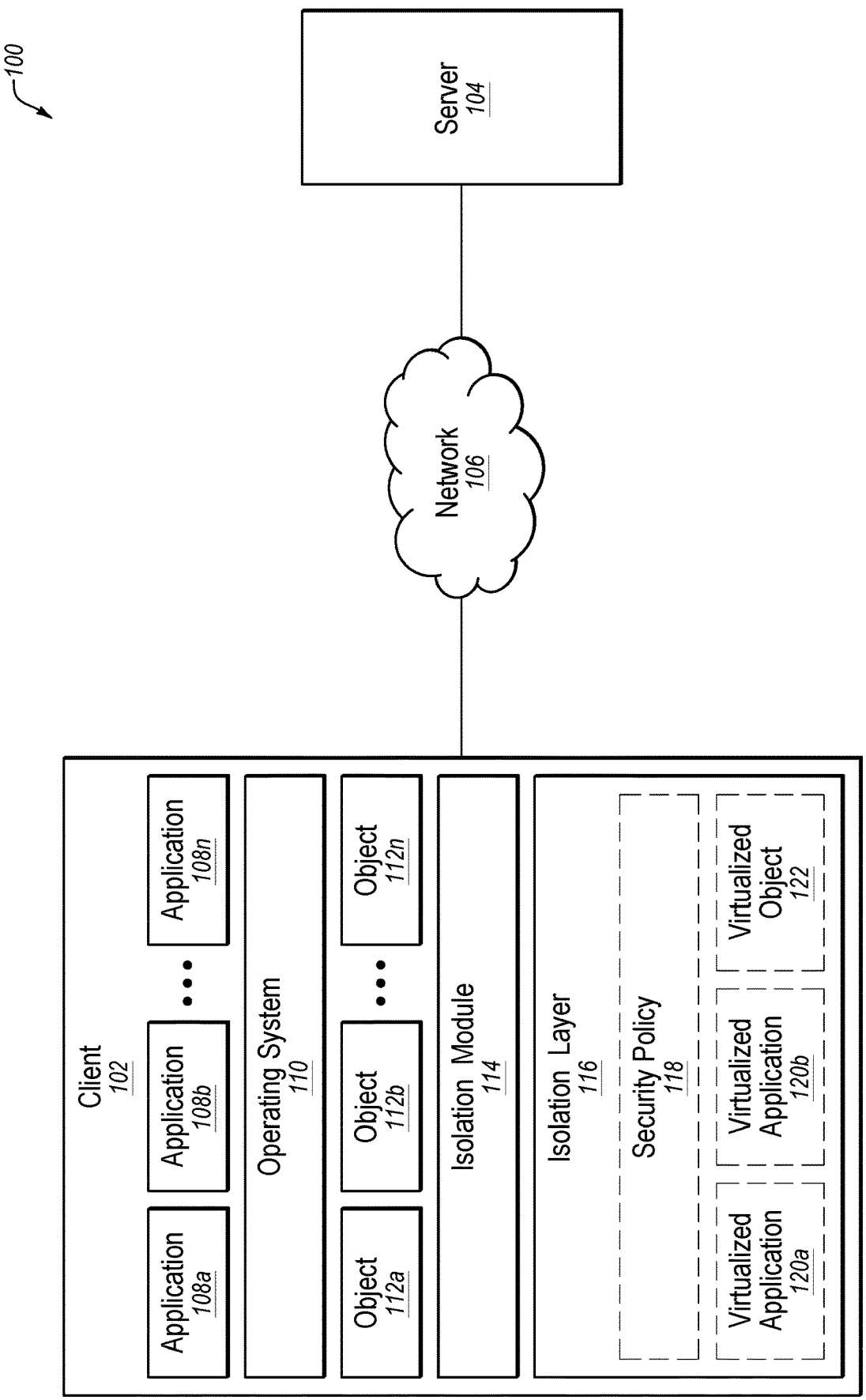
FIG. 1 illustrates an example system configured to bring a non-isolated application into an isolation layer with an isolated application.

Some embodiments in this disclosure relate to bringing a non-isolated application into an isolation layer with an isolated application.

While an isolation layer may be effective for executing and monitoring a stand-alone-type application, the isolation layer may not be realistic for executing and monitoring an application that seeks to communicate with or share objects with another application that is executing outside the application layer. In particular, a potentially malicious application may be executed, or quarantined, in an isolation layer while a previously-approved application may be simultaneously executing in a standard operating environment outside the isolation layer. Since the potentially malicious application is executing in the isolation layer, the potentially malicious application may be unable to access applications or objects outside the isolation layer, such as e.g., a file system, a file stored in the file system, a network connection, a portion of memory, or a remote procedure call. In contrast, the previously-approved application may have relatively free access to objects outside the application layer. Therefore, where one of these objects outside the isolation layer is associated with the previously-approved application, the potentially malicious application may not be able to share the object with the previously-approved application.

For example, if a new photo editing application is identified as being potentially malicious, it may be executed, or quarantined, in an isolation layer. During the execution of the photo editing application, the photo editing application may request to access a photo in a file system controlled by a photo organizing application that is executing in a standard operating environment outside the isolation layer. Since the requested photo and the photo organizing application are outside the isolation layer, the photo editing application, which has been quarantined, may be denied access to the requested photo and the photo organizing application. Since no photo outside the isolation layer, or photo editing application outside the isolation layer, is accessible to the photo editing application while it is executing in the isolation layer, the isolation layer may not be a realistic environment in which to execute and monitor the potentially malicious photo editing application.

In other examples, other types of objects and related applications may be inaccessible to a potentially malicious application executing in an isolation layer. In particular, other objects including, but not limited to, a file system, a file stored in the file system, a network connection, a portion of memory, or a remote procedure call, and an application associated with any one of these objects, may be inaccessible to the potentially malicious application. Where access to any of these objects may be needed to realistically execute and monitor the potentially malicious application, the isolation layer may not be a realistic environment in which to execute and monitor the potentially malicious application.

The embodiments disclosed herein may provide various benefits. In particular, the embodiments disclosed herein may, for example, bring a non-isolated application into an isolation layer with an isolated application. In some embodiments, a request is received from the isolated application to share an object with the non-isolated application. Then, in response to this request, the non-isolated application may be brought into the isolation layer so that both applications can share the object.

For example, if a photo editing application is identified as being potentially malicious, it may be executed, or quarantined, in an isolation layer. During the execution of the photo editing application, the photo editing application may request to access a photo in a file system controlled by a photo organizing application that is executing in a standard operating environment outside the isolation layer. In response to the request, the photo editing application, or a portion thereof, as well as the requested photo, may be brought into the isolation layer in virtualized forms. Thus, these virtualized forms of the requested photo and the photo editing application may become accessible to the isolated photo editing application. In this manner, the isolation layer may become a more realistic environment in which to execute and monitor the potentially malicious photo editing application.

In other examples, other types of objects and related applications may be made accessible to a potentially malicious application executing in an isolation layer. In particular, other objects including, but not limited to, a file system, a file stored in the file system, a network connection, a portion of memory, or a remote procedure call, and an application associated with any one of these objects, may be made accessible to the potentially malicious application by bringing them into the isolation layer in virtualized forms. In this manner, the isolation layer may become a more realistic environment in which to execute and monitor the potentially malicious application.

Turning to the figures, FIG. 1 illustrates an example system 100 configured to bring a non-isolated application into an isolation layer with an isolated application. The system 100 may include a client 102, a server 104, and a network 106.

In some embodiments, the client 102 may be any computer system capable of functioning as a client. In some embodiments, the client 102 may be configured to communicate over the network 106 with the server 104. The client 102 may include applications 108a, 108b, and 108n. The applications 108a, 108b, and 108n may or may not be currently executing on the client 102. When executing, the applications 108a, 108b, and 108n may be executing in a standard operating environment provided by the operating system 110, or another operating environment. The client 102 may further include objects 112a, 112b, and 112n which, as noted above, can be any object that may be shared among two or more applications including, but not limited to, a file system, a file stored in the file system, a network connection, a portion of memory, or a remote procedure call.

In some embodiments, the client 102 may also include an isolation module 114 and an isolation layer 116. The isolation module 114 may be employed to execute, or quarantine, one or more of the applications 108a-108n in the isolation layer 116 in a virtualized form. For example, the isolation module 114 may be employed to execute the application 108a as the virtualized application 120a. Similarly, the isolation module 114 may be employed to bring one or more of the applications 108a-108n, and one or more of the objects 112-112n, into the isolation layer 116 in virtualized forms in response to a request from an isolated application to share one of the objects 112a-112n. For example, the isolation module 114 may be employed to bring the application 108b into the isolation layer 116 as a virtualized application 120b in response to a request from the virtualized application 120*a* to share the object 112*a* with the application 108*b*. At the same time, the isolation module 114 may be employed to bring the object 112*a* into the isolation layer 114 as the virtualized object 122.

In some embodiments, the isolation layer 116 may also include a security policy 118. The security policy 118 may define certain of the applications 108*a*-108*n* and/or certain of the objects 112*a*-112*n* as private. Those applications and objects defined as private in the security policy 118 may be those applications and objects that are never to be accessed by any potentially malicious application. For example, certain system critical objects may be defined as private. Examples of system critical objects may include, but are not limited to, a credential store of the client 102 containing passwords for network or computer access, files of the client 102 containing social security numbers of employees, a network connection of the client 102 to a top-secret network, and a portion of memory of the client 102 responsible for maintaining the proper functioning of the operating system 110. In another example, certain system critical applications may be defined as private. Examples of system critical applications may include, but are not limited to, an application of the client 102 running an active life-support machine in a hospital, an application of the client 102 running the guidance system on an airborne airplane, and an application of the client 102 running a power grid during a heat wave. Thus, the security policy 118 may define certain private applications and/or objects that may not be brought into the isolation layer 116 even if a request is received from an isolated application. The security policy 118 may thereby provide limits to the ability of the isolation module 114 to bring applications and objects into the isolation layer 116.

In some embodiments, the server 104 may be any computer system capable of functioning as a server. In some embodiments, the server 104 may be configured to facilitate communication sessions between the client 102, the server 104, and/or other similar clients or servers. For example, the server 104 may operate as a web server and host a website that can be accessed using web browsers executing on the client 102 and other similar clients. In another example, the server 104 may operate as an exchange configured to establish communication sessions, such as telephone calls, video calls, and data sharing sessions between systems or devices such as the client 102 and another system or device. In some embodiments, the server 104 may be configured similarly to the client 102, with each of the components 108*a*-122. Therefore, the capability of the components 108*a*-122 of the client 102 may be replicated on the server 104.

In some embodiments, the network 106 may be configured to communicatively couple the client 102 and the server 104 as well as other similar systems and/or devices. In some embodiments, the network 106 may be any wired or wireless network, or combination of multiple networks, configured to send and receive communications between systems and devices. In some embodiments, the network 106 may include a Personal Area Network (PAN), Local Area Network (LAN), Metropolitan Area Network (MAN), a Wide Area Network (WAN), or a Storage Area Network (SAN). In some embodiments, the network 106 may also be coupled to, or may include, portions of a telecommunications network, including telephone lines, for sending data in a variety of different communication protocols, such as a cellular network or a Voice over IP (VoIP) network.

Modifications, additions, or omissions may be made to the system 100 without departing from the scope of the present disclosure. For example, in some embodiments, only a single client 102, or a single server 104 with components similar to the client 102, may be employed to bring a non-isolated application into an isolation layer with an isolated application. Further, in some embodiments, the system 100 may include additional devices and systems similar to the devices and systems illustrated in FIG. 1 that each may be configured similarly to the devices and systems illustrated in FIG. 1.

Figure 2:
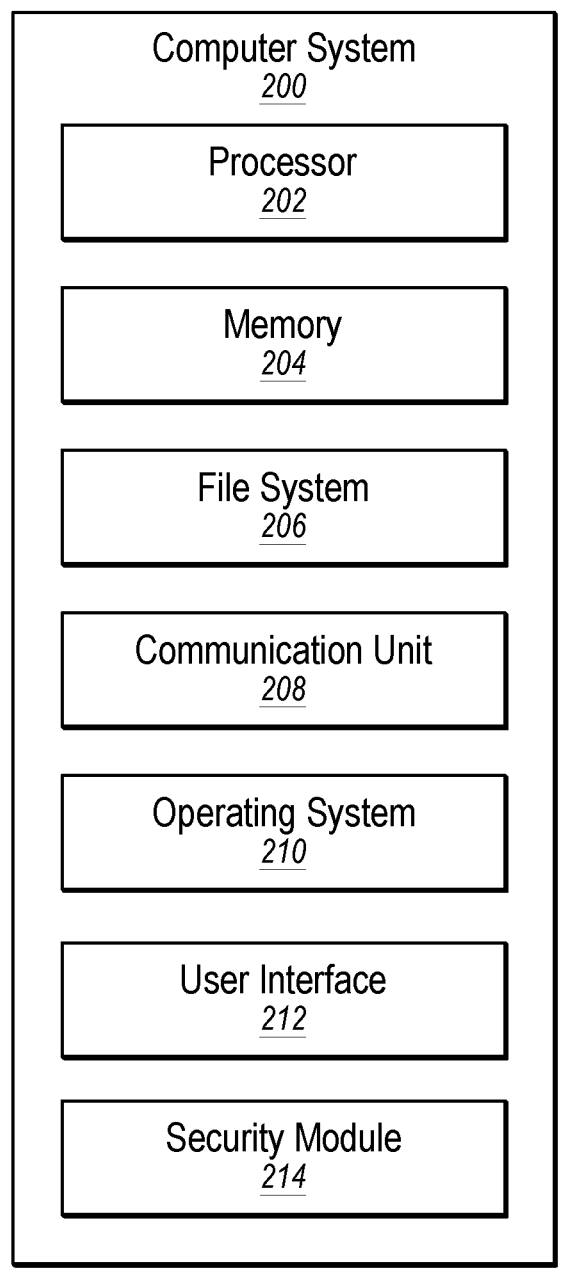
FIG. 2 illustrates an example computer system that may be employed in bringing a non-isolated application into an isolation layer with an isolated application.

FIG. 2 illustrates an example computer system 200 that may be employed in bringing a non-isolated application into an isolation layer with an isolated application. In some embodiments, the computer system 200 may be part of any of the systems or devices described in this disclosure. For example, the computer system 200 may be part of the client 102 or the server 104 of FIG. 1.

The computer system 200 may include a processor 202, a memory 204, a file system 206, a communication unit 208, an operating system 210, a user interface 212, and a security module 214, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 202 may interpret and/or execute program instructions and/or process data stored in the memory 204 and/or the file system 206. In some embodiments, the processor 202 may fetch program instructions from the file system 206 and load the program instructions into the memory 204. After the program instructions are loaded into the memory 204, the processor 202 may execute the program instructions. In some embodiments, the instructions may include the processor 202 bringing a non-isolated application into an isolation layer with an isolated application.

Figure 3A:
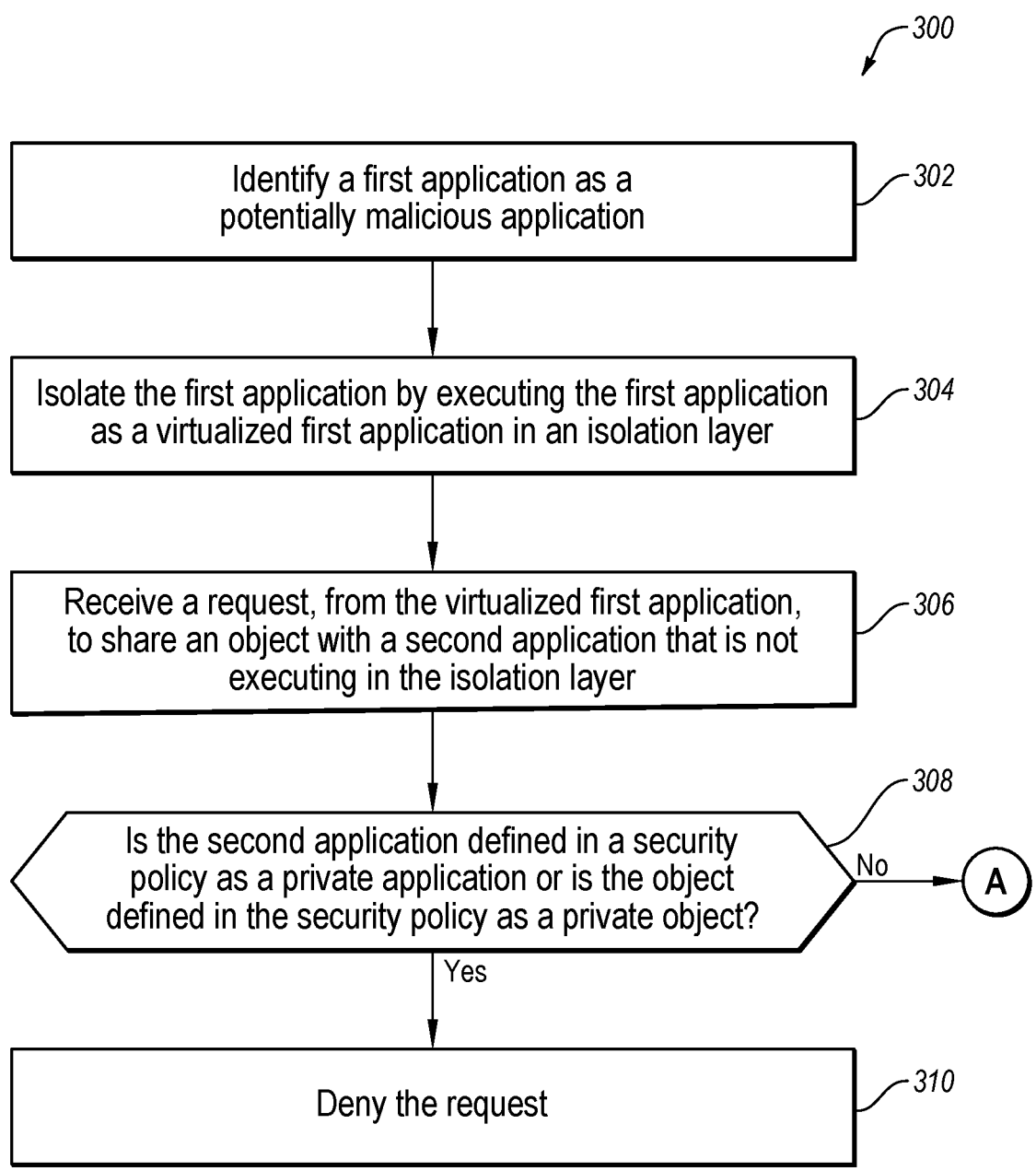
FIGS. 3A and 3B is a flowchart of an example method for bringing a non-isolated application into an isolation layer with an isolated application.
Figure 3B:
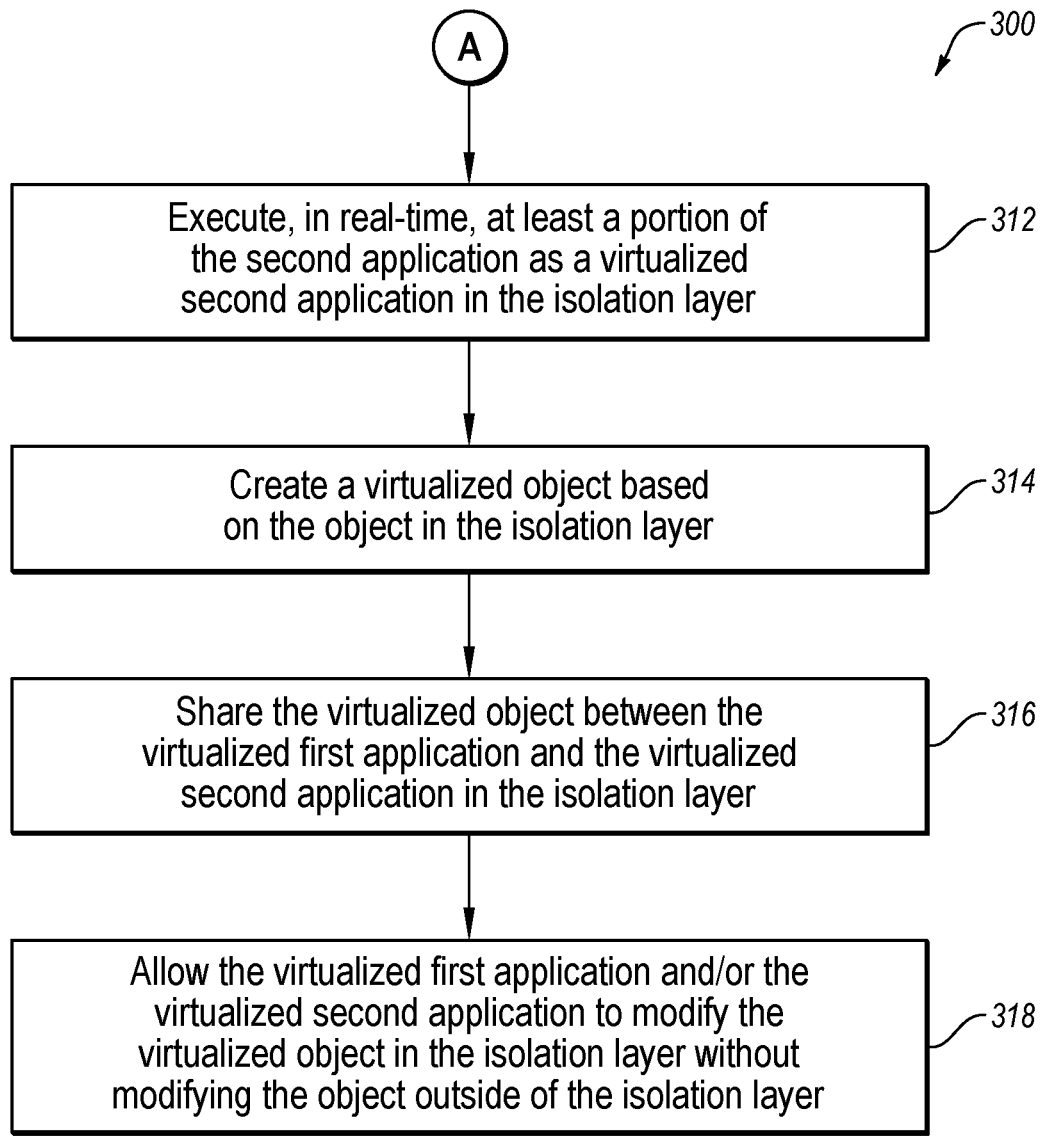

The memory 204 and the file system 206 may include computer-readable storage media for carrying or having stored thereon computer-executable instructions or data structures. Such computer-readable storage media may be any available non-transitory media that may be accessed by a general-purpose or special-purpose computer, such as the processor 202. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations, such as one or more blocks of the method 300 of FIGS. 3A and 3B. These computer-executable instructions may be included, for example, in the operating system 210, in one or more applications, such as the security module 214, or in some combination thereof.

The communication unit 208 may include any component, device, system, or combination thereof configured to transmit or receive information over a network, such as the network 106 of FIG. 1. In some embodiments, the communication unit 208 may communicate with other devices at other locations, the same location, or even other components within the same system. For example, the communication unit 208 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 208 may permit data to be exchanged with a network and/or any other devices or systems, such as those described in the present disclosure.

The operating system 210 may be configured to manage hardware and software resources of the computer system 200 and configured to provide common services for the computer system 200. The operating system 210 may be configured similarly to the operating system 110 of FIG. 1, and may provide a standard operating environment for executing applications that are outside an isolation layer, such as the isolation layer 116 of FIG. 1. The operating system 110 or 210 may also provide an isolation layer, such as the isolation layer 116 of FIG. 1.

The user interface 212 may include any device configured to allow a user to interface with the computer system 200. For example, the user interface 212 may include a display, such as an LCD, LED, or other display, that is configured to present video, text, application user interfaces, and other data as directed by the processor 202. The user interface 212 may further include a mouse, a track pad, a keyboard, a touchscreen, volume controls, other buttons, a speaker, a microphone, a camera, any peripheral device, or other input or output device. The user interface 212 may receive input from a user and provide the input to the processor 202. Similarly, the user interface 212 may present output to a user.

The security module 214 may be one or more computer-readable instructions stored on one or more non-transitory computer-readable media, such as the memory 204 or the file system 206, that, when executed by the processor 202, is configured to perform a security action on applications identified as malicious or identified as safe. For example, once the isolation module 114 of FIG. 1 identifies a particular one of the applications 108a-108n as malicious or safe, the security module may be configured to either discard the application or allow the application to execute in a standard operating environment of the operating system 210 or 110, respectively. In some embodiments, the security module 214 may be part of the operating system 210 or may be part of an application of the computer system 200, or may be some combination thereof.

Modifications, additions, or omissions may be made to the computer system 200 without departing from the scope of the present disclosure. For example, although each is illustrated as a single component in FIG. 2, any of the components 202-214 of the computer system 200 may include multiple similar components that function collectively and are communicatively coupled. Further, although illustrated as a single computer system, it is understood that the computer system 200 may include multiple physical or virtual computer systems that are networked together, such as in a cloud computing environment, a multitenancy environment, or a virtualization environment.

FIG. 3 is a flowchart of an example method 300 for bringing a non-isolated application into an isolation layer with an isolated application. The method 300 may be performed, in some embodiments, by a device or system, such as by the client 102 or the server 104 of FIG. 1. In these and other embodiments, the method 300 may be performed by one or more processors based on one or more computer-readable instructions stored on one or more non-transitory computer-readable media. The method 300 will now be described in connection with FIGS. 1 and 3.

At block 302, a first application may be identified as a potentially malicious application. For example, the isolation module 114 of FIG. 1 may identify, at block 302, the application 108a as a potentially malicious application. A malicious application may be an application that includes, for example, one or more of spyware, a virus, a worm, a logic bomb, a trapdoor, a trojan horse, a Remote Admin Trojan (RAT), malware, mobile malicious code, malicious font, and rootkits.

At block 304, the first application may be isolated by executing the first application as a virtualized first application in an isolation layer. For example, the isolation module 114 of FIG. 1 may isolate, at block 304, the application 108a by executing the application 108a as the virtualized application 120a in the isolation layer 116.

In some embodiments, the isolation layer may prevent any application executing therein from modifying an operating system associated with the isolation layer and/or from communicating with any application executing outside of the isolation layer. For example, the isolation layer 116 of FIG. 1 may prevent any of the virtualized applications 120a and 120b executing therein from modifying the operating system 110 associated with the isolation layer 116. The operating system 110 may be associated with the isolation layer 116, for example, due to the isolation layer 116 being a standard feature of the operating system 110 or due to the isolation layer 116 itself being an application that is executing in a standard operating environment provided by the operating system 110. In another example, the isolation layer 116 of FIG. 1 may prevent any of the virtualized applications 120a and 120b executing therein from communicating with the applications 108a-108n that are executing outside of the isolation layer 116.

At block 306, a request may be received, from the virtualized first application, to share an object with a second application that is not executing in the isolation layer. For example, the isolation module 114 of FIG. 1 may receive, at block 306, a request from the virtualized application 120a to share the object 112a with the application 108b that is not executing in the isolation layer 116. In this example, the application 108b may be a non-isolated application that is executing in a standard operating environment provided by the operating system 110 or that is not currently being executed.

Further, in some embodiments, the object may be a file stored in a file system, a file system, a network connection, a portion of memory, or a remote procedure call. In these embodiments, the corresponding request received from the virtualized first application may include a request to allow the virtual first application and the second application to access and modify the file in the file system, a request to allow the virtual first application and the second application to access and modify one or more files in the file system, a request to allow the virtual first application and the second application to communicate over the network connection, a request to allow the virtual first application and the second application to access and modify the portion of memory, or a request to allow the virtual first application and the second application to execute the remote procedure call, respectively.

At decision block 308, it may be determined whether the second application is defined in a security policy as a private application or whether the object is defined in the security policy as a private object. In some embodiments, the security policy may define, as private, applications and/or objects that are never to be accessed by any potentially malicious application. If so (Yes at decision block 308), at block 310 the request may be denied. If not (No at decision block 308), the method may proceed to blocks 312-318. For example, the isolation module 114 of FIG. 1 may determine, at decision block 308, whether the second application is defined in the security policy 118 as a private application or whether the object 112a is defined in the security policy 118 as a private object. If so (Yes at decision block 308), the isolation module 114 may deny, at block 310, the request received at block 306 from the virtualized application 120a to share the object 112a with the application 108b. Alternatively, if not (No at decision block 308), the isolation module 114 may proceed to blocks 312-318 of the method 300.

At block 312, at least a portion of the second application may be executed, in real-time, as a virtualized second application in the isolation layer. For example, the isolation module 114 may execute in real-time, at block 312, at least a portion of the application 108b as the virtualized application 120b in the isolation layer 116. In this example, only a portion of the application 108b may be executed as the virtualized application 120b, for example, because only a portion of the functionality of the application 108b has been requested by the virtualized application 120a or because only a portion of the functionality of the application 108b is relevant to the request received from the virtualized application 120a at block 306.

At block 314, a virtualized object may be created based on the object in the isolation layer. For example, the isolation module 114 may create, at block 314, the virtualized object 122, based on the object 112a, in the isolation layer 116.

At block 316, the virtualized object may be shared between the virtualized first application and the virtualized second application in the isolation layer. For example, the isolation module 114 may share, at block 316, the virtualized object 122 between the virtualized application 120a and the virtualized application 120b.

At block 318, the virtualized first application and/or the virtualized second application may be allowed to modify the virtualized object in the isolation layer without modifying the object outside of the isolation layer. For example, the isolation module 114 may allow, at block 318, the virtualized application 120a and/or the virtualized application 120b to modify the virtualized object 122 that is inside the isolation layer 116 without modifying the corresponding object 112a that is outside the isolation layer 116. The modification of the virtualized object 122 may pose less of a security threat than modification of a corresponding actual object such as the object 112a.

The method 300 may thus be employed, in some embodiments, to bring a non-isolated application into an isolation layer with an isolated application. In some embodiments, bringing the non-isolated application, and an associated object, into the isolation layer may enable the isolation layer to be a more realistic environment in which to execute and monitor a potentially malicious application. In some embodiments, the isolated application may further be unaware that the non-isolated application and associated object which it accesses are actually virtualized forms of the real application and real object. In this manner, the isolated application may be able to function more realistically in the isolation environment, which may allow monitoring of the isolated application while it functions similarly to the normal way it would function outside the isolation layer.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, block 302 may be eliminated from the method 300. Additionally or alternatively, blocks 308 and 310 may be eliminated from the method 300, in which case the method 300 may proceed directly from block 306 to block 312. Additionally or alternatively, block 318 may be eliminated from the method 300. Therefore, in some embodiments, the method 300 may include only blocks 304, 306, 312, 314, and 316. Further, in some embodiments, the method 300 may include multiple isolated applications, multiple non-isolated applications, and/or multiple shared objects. Therefore, the discussion in the method 300 of a single isolated application, a single non-isolated application, and a single shared object is only one example embodiment, and embodiments with two or more of any of these three components may also be employed.

Further, it is understood that the method 300 may improve the functioning of a computer system. For example, the functioning of the client 102 of FIG. 1 may itself be improved by the method 300 because a potentially malicious application may be isolated in the isolation layer 116, and then a non-isolated application, and an associated object, may be brought into the isolation layer 116 in virtualized form, thus enabling the isolated application to function more realistically in the isolation environment. In this manner, monitoring of the isolated application may take place while the isolated application functions similarly to the way it would function outside the isolation layer, unlike conventional isolation layers which simply deny requests by an isolated application to access objects or applications outside the isolation layer.

Also, the method 300 may improve the technical field of malicious application detection at least because conventional isolation layer configurations do not allow any applications or objects outside of the isolation layer to be accessed by an isolated application. The ability of the isolation layer disclosed herein to share an object with a non-isolated application, at least in virtualized form, may allow for a more realistic execution of an isolated application, thereby enabling a more accurate determination as to whether the isolated application is in fact a malicious application.

As indicated above, the embodiments described herein may include the use of a special purpose or general purpose computer (e.g., the processor 202 of FIG. 2) including various computer hardware or software modules, as discussed in greater detail below. Further, as indicated above, embodiments described herein may be implemented using computer-readable media (e.g., the memory 204 or file system 206 of FIG. 2) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for bringing a non-isolated computer application into an isolation layer with an isolated computer application, at least a portion of the method being performed by a computing device comprising at least one processor, the method comprising:
   identifying a first non-operating system (non-OS) computer application as a potentially malicious non-OS computer application;
   isolating the first non-OS computer application by executing the first non-OS computer application as a virtualized first non-OS computer application in the isolation layer, the isolation layer preventing any non-OS computer application executing therein from modifying an operating system associated with the isolation layer and from communicating with any non-OS computer application executing outside of the isolation layer;
   receiving a request, from the virtualized first non-OS computer application, to share a computer object with a second non-OS computer application that is not executing in the isolation layer; and
   in response to the receiving of the request:
      executing, in real-time, at least a portion of the second non-OS computer application as a virtualized second non-OS computer application in the isolation layer;
      creating a virtualized computer object based on the computer object in the isolation layer; and
      sharing the virtualized computer object between the virtualized first non-OS computer application and the virtualized second non-OS computer application in the isolation layer.

2. The method of claim 1, further comprising:
   in response to the receiving of the request, allowing the virtualized first non-OS computer application and/or the virtualized second non-OS computer application to modify the virtualized computer object in the isolation layer without modifying the computer object outside of the isolation layer.

3. The method of claim 1, wherein:
   the computer object is a file stored in a file system; and
   the request received from the virtualized first non-OS computer application comprises a request to allow the virtual first non-OS computer application and the second non-OS computer application to access and modify the file in the file system.

4. The method of claim 1, wherein:
the computer object is a file system; and
the request received from the virtualized first non-OS computer application comprises a request to allow the virtual first non-OS computer application and the second non-OS computer application to access and modify one or more files in the file system.

5. The method of claim 1, wherein:
the computer object is a network connection; and
the request received from the virtualized first non-OS computer application comprises a request to allow the virtual first non-OS computer application and the second non-OS computer application to communicate over the network connection.

6. The method of claim 1, wherein:
the computer object is a portion of memory; and
the request received from the virtualized first non-OS computer application comprises a request to allow the virtual first non-OS computer application and the second non-OS computer application to access and modify the portion of memory.

7. The method of claim 1, wherein:
the computer object is a remote procedure call; and
the request received from the virtualized first non-OS computer application comprises a request to allow the virtual first non-OS computer application and the second non-OS computer application to execute the remote procedure call.

8. A computer-implemented method for bringing a non-isolated computer application into an isolation layer with an isolated computer application, at least a portion of the method being performed by a computing device comprising at least one processor, the method comprising:
identifying a first non-operating system (non-OS) computer application as a potentially malicious non-OS computer application;
isolating the first non-OS computer application by executing the first non-OS computer application as a virtualized first non-OS computer application in the isolation layer, the isolation layer preventing any non-OS computer application executing therein from modifying an operating system associated with the isolation layer and from communicating with any non-OS computer application executing outside of the isolation layer;
receiving a request, from the virtualized first non-OS computer application, to share a computer object with a second non-OS computer application that is not executing in the isolation layer; and
in response to the receiving of the request:
verifying, in real-time, that the second non-OS computer application is not defined in a security policy as a private non-OS computer application and that the computer object is not defined in the security policy as a private computer object;
executing, in real-time, at least a portion of the second non-OS computer application as a virtualized second non-OS computer application in the isolation layer;
creating a virtualized computer object based on the computer object in the isolation layer;
sharing the virtualized computer object between the virtualized first non-OS computer application and the virtualized second non-OS computer application in the isolation layer; and
allowing the virtualized first non-OS computer application and/or the virtualized second non-OS computer application to modify the virtualized computer object in the isolation layer without modifying the computer object outside of the isolation layer.

9. The method of claim 8, wherein the security policy defines, as private, non-OS computer applications and computer objects that are never to be accessed by any potentially malicious non-OS computer application.

10. The method of claim 8, wherein:
the computer object is a file stored in a file system; and
the request received from the virtualized first non-OS computer application comprises a request to allow the virtual first non-OS computer application and the second non-OS computer application to access and modify the file in the file system.

11. The method of claim 8, wherein:
the computer object is a network connection; and
the request received from the virtualized first non-OS computer application comprises a request to allow the virtual first non-OS computer application and the second non-OS computer application to communicate over the network connection.

12. One or more non-transitory computer-readable media comprising one or more computer-readable instructions that, when executed by one or more processors of one or more computing devices, cause the one or more computing devices to:
identify a first non-operating system (non-OS) computer application as a potentially malicious non-OS computer application;
isolate the first non-OS computer application by executing the first non-OS computer application as a virtualized first non-OS computer application in an isolation layer, the isolation layer preventing any non-OS computer application executing therein from modifying an operating system associated with the isolation layer and from communicating with any non-OS computer application executing outside of the isolation layer;
receive a request, from the virtualized first non-OS computer application, to share a computer object with a second non-OS computer application that is not executing in the isolation layer; and
in response to the receiving of the request:
verify, in real-time, that the second non-OS computer application is not defined in a security policy as a private non-OS computer application and that the computer object is not defined in the security policy as a private computer object;
execute, in real-time, at least a portion of the second non-OS computer application as a virtualized second non-OS computer application in the isolation layer;
create a virtualized computer object based on the computer object in the isolation layer;
share the virtualized computer object between the virtualized first non-OS computer application and the virtualized second non-OS computer application in the isolation layer; and
allow the virtualized first non-OS computer application and/or the virtualized second non-OS computer application to modify the virtualized computer object in the isolation layer without modifying the computer object outside of the isolation layer.

13. The one or more non-transitory computer-readable media of claim 12, wherein the security policy defines, as private, non-OS computer applications and computer objects that are never to be accessed by any potentially malicious non-OS computer application.

14. The one or more non-transitory computer-readable media of claim 12, wherein:
   the computer object is a portion of memory; and
   the request received from the virtualized first non-OS computer application comprises a request to allow the virtual first non-OS computer application and the second non-OS computer application to access and modify the portion of memory.

15. The one or more non-transitory computer-readable media of claim 12, wherein:
   the computer object is a remote procedure call; and
   the request received from the virtualized first non-OS computer application comprises a request to allow the virtual first non-OS computer application and the second non-OS computer application to execute the remote procedure call.

* * * * *